Patented Feb. 12, 1929.

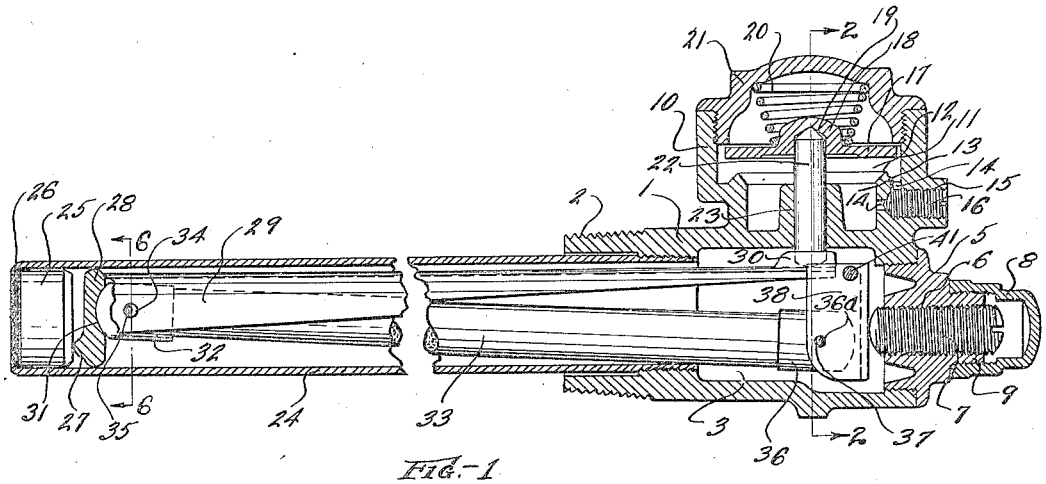
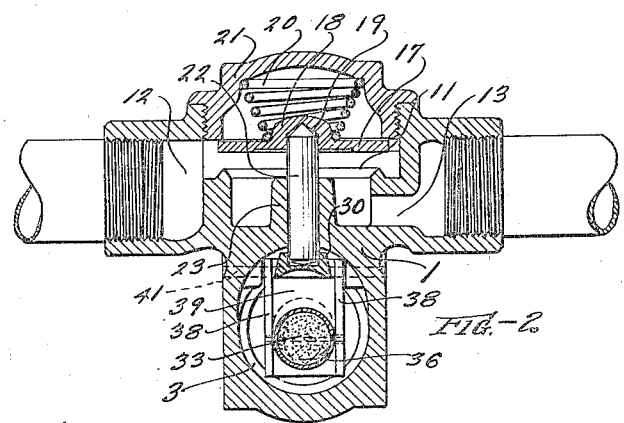
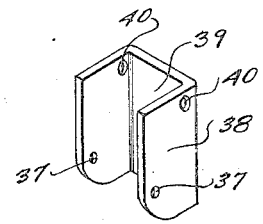
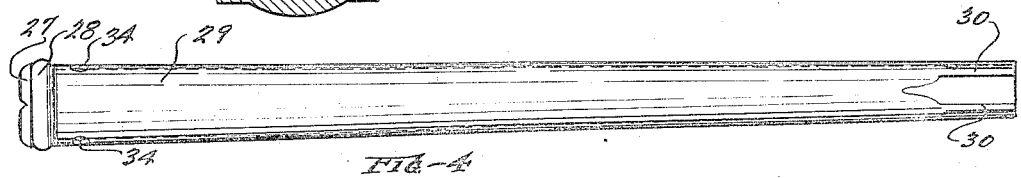
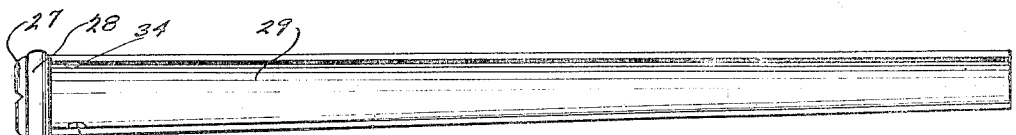
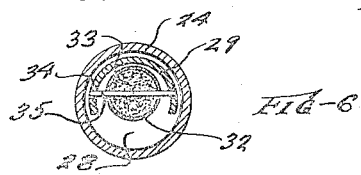

1,702,053

UNITED STATES PATENT OFFICE.

CLARENCE H. MORROW, OF CLEVELAND, OHIO, ASSIGNOR TO THE HOTSTREAM HEATER COMPANY, OF CLEVELAND, OHIO, A CORPORATION OF OHIO.

THERMOSTAT FOR DOMESTIC WATER BOILERS.

Application filed May 23, 1927. Serial No. 193,567.

This invention relates to thermostatic devices and particularly to that class employing a tubular heat responsive element adapted to project into a boiler or jacket for regulating the fuel to the heater for heating water for a domestic boiler.

Heretofore, in devices of this character, the heat responsive element has been in the form of a tube of some length encasing a non-expanding element and both mounted in a suitable thermostat body adapted to be secured in the boiler or other casing and receiving a suitable gas valve operating mechanism for controlling the gas supply. This valve mechanism, in some instances, has included a lever, and in all of these arrangements it has been difficult to house a lever of the proper length for maximum operation without rendering the thermostat body unduly large and unwieldy.

The present invention, therefore, contemplates the production of a minimum sized thermostat of this type including lever mechanism extending into, and in one arrangement co-extensive with, the heat responsive element whereby long leverage and maximum valve opening are obtained without unduly increasing the size of the thermostat body.

Other features of the invention will be apparent from the following description, drawings and claims.

In the drawings, Fig. 1 is a vertical section through the device; Fig. 2 is a section upon line 2—2, Fig. 1; Fig. 3 is a detail view of a non-expanding pencil support; Fig. 4 is a top plan view of the lever; Fig. 5 is a bottom plan view of the lever; and Fig. 6 is a section upon the line 6—6, Fig. 1.

In the embodiment shown, 1 represents a thermostat body having a hollow threaded shank 2 forming a fitting for attachment in a boiler or other casing. The thermostat body 1, in alignment with the opening of the shank 2, is provided with a threaded opening 6 adapted to receive an adjusting screw 7 for a purpose to be described. A suitable cap 8 is threaded on to a reduced shank 9 of this plug 5 to seal off the adjustment. Preferably integral with the thermostat body 5 is a valve body 10 having a valve seat 11 therein separating the inlet chamber 12 from the outlet chamber 13. Suitable by-pass ports 14 lead to a threaded opening 15. A plug 16 is arranged in this opening 15 and these parts serve as a pilot by-pass from one side of the valve to the other. Cooperating with the valve seat is a valve 17 provided with a central boss 18 having an opening 19 therein. Engaging the boss 18 is a spring 20 forced down by a cap 21 secured to the valve body. The inner wall of the opening 19 is engaged by a pin 22 extending down through a suitable guide and partition 23 and into the chamber 3 in the thermostat body. This pin engages the lever mechanism to be described.

Threaded into the thermostat body is the heat responsive element or tube 24 of a suitable length to give the desired amount of thermostatic movement. The end of this tube 24 is closed by a plug or abutment 25 soldered in place and prevented from endwise movement out of the end of the tube by peening the edge of the tube as at 26. Engaging the plug 25 is a fulcrum projection 27 forming a part of a lever cap 28 carrying a lever 29 trough shape in cross section and tapering from the cap 28 to its outer free end where it is provided with upstanding side boards 30. These side boards receive a guide between them and the pin 22, as shown, so that cooperation with the lever of the pin is insured. The lever formed by the parts 28 and 29 is of bell crank shape with the fulcrum 27 and the non-expanding pencil socket, to be described, on the short arm.

The lever cap 28 is provided with a spherical seat 31 adapted to receive a pencil cap 32 arranged upon the end of a non-expanding pencil 33. To insure the cap 32 remaining in engagement with the seat a suitable opening 34 is provided in the sides of the lever and a pin 35 extends through these openings and is anchored in the cap 32. The non-expanding pencil 33, at its opposite end, is provided with another cap 36 also provided with an opening 37 for receiving a pin 36ª extending into openings 37 in a pencil support 38. This pencil support is in the form of a channel with sides and a solid back 39 and with upper openings 40 near its lower end and at the back 39 for the reception of a pivot pin 41 arranged in the thermostat body. The sides of the channel shaped pencil support engage the sides of the end of the lever 29 and maintain it in proper operating position. When the parts are properly proportioned and mounted the solid back 39 of the pencil support engages the adjusting screw 7.

The apparatus is used and applied by screwing the threaded connection 2, of the thermostatic body, into a tank, or casing which is in circulatory communication with the water or other liquid to be heated by the heater. The fuel is then supplied to the inlet 12 of the valve body. If the liquid surrounding the heat responsive tube 24 is at a low temperature, the parts are arranged and adjusted by the screw 7 so that the valve lever is in the position shown in Fig. 1 and the valve is held open and fuel is supplied to the burner of the heater. As the temperature of the liquid surrounding the tube 24 rises to the point where the thermostat is adjusted by the screw 7, the tube 24 expands and causes the valve lever to move clockwise, as shown in the drawings, and the fuel valve seats, thus shutting off the main supply of fuel to the burner and merely permitting a by-pass around the valve for pilot purposes. When the temperature surrounding the tube 24 drops the reverse operation takes place. In this way the temperature of the liquid is controlled and held at the desired point. If the user wishes to raise or lower the temperature he may accomplish this result by adjusting the screw 7 which changes the functioning of the non-expanding pencil 23 and produces the change in the temperature.

By the arrangement disclosed in this case a long valve operating lever may be used to great advantage in obtaining a large opening of the gas valve, thereby permitting reduction in the size of the gas valve and the accompanying parts.

What I claim is:

1. A thermostat for apparatus of the class described, comprising a gas valve body having a valve seat and valve therein, a tubular heat responsive thermostatic element anchored in said body and communicating therewith, an abutment in the outer end of said tubular element, a non-expanding element having a rounded end and a relatively fixed abutment at the valve body end thereof and projecting into and towards the end of said tubular element, and a bell crank lever fulcrumed on said non-expanding element and engaging said abutment of the thermostatic element and provided with a socket for receiving the rounded end of the non-expanding element, and a long lever arm extending through the tubular element and into the gas valve body where it engages the valve.

2. As in claim 1 wherein the non-expanding element is provided with a rounded end and the short arm of the lever is provided with a socket for receiving said rounded end, and means for loosely coupling the rounded end of the non-expanding element to the lever to insure proper engagement.

3. A thermostat for apparatus of the class described, comprising a gas valve body having a valve seat and valve therein, a tubular heat responsive thermostatic element anchored in said body and communicating therewith, an abutment in the outer end of said tubular element, an operating unit within said valve body and said tubular element comprising a relatively non-expanding member having movement in said valve body and said tubular element and a bell crank operating lever carried by said member and including a relatively short arm engaging the abutment at the end of the tubular element and a relatively long arm extending through the element into the valve body, and abutment means for the non-expanding element comprising a lever fulcrumed in the gas body and loosely connected to said non-expanding element, and means for adjusting the movement of said abutment lever.

4. A thermostat as in claim 3 wherein the means for adjusting the abutment lever comprises a screw extending through the gas valve body.

5. A thermostat as in claim 3 wherein the abutment lever is provided with flanges embracing the end of the non-expanding element and the end of the long lever arm for maintaining them in operative position and for guiding the lever arm into proper engagement with the valve of the gas body.

In testimony whereof I hereby affix my signature.

CLARENCE H. MORROW.